(12) United States Patent
Cui

(10) Patent No.: US 9,280,843 B1
(45) Date of Patent: *Mar. 8, 2016

(54) HYBRID IMAGES FOR MAPS COMBINING LOW FREQUENCY MAP DATA AND HIGH FREQUENCY SATELLITE IMAGE DATA

(71) Applicant: Google Inc., Mountain View, CA (US)

(72) Inventor: Ming Cui, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 13/925,514

(22) Filed: Jun. 24, 2013

Related U.S. Application Data

(63) Continuation of application No. 13/213,467, filed on Aug. 19, 2011, now Pat. No. 8,488,907.

(51) Int. Cl.
*G06K 9/00* (2006.01)
*G06T 11/60* (2006.01)
*G06K 9/36* (2006.01)

(52) U.S. Cl.
CPC .. *G06T 11/60* (2013.01); *G06K 9/36* (2013.01)

(58) Field of Classification Search
CPC ..................................................... G06T 11/60
See application file for complete search history.

(56) References Cited

U.S. PATENT DOCUMENTS

| 5,187,754 | A  | 2/1993 | Currin et al. |
| 6,434,265 | B1 | 8/2002 | Xiong et al. |
| 2005/0089246 | A1* | 4/2005 | Luo .............................. 382/286 |
| 2006/0064233 | A1 | 3/2006 | Adachi et al. |
| 2006/0136402 | A1 | 6/2006 | Lee |
| 2009/0324135 | A1 | 12/2009 | Kondo et al. |
| 2012/0200864 | A1* | 8/2012 | Dalal et al. ..................... 358/1.9 |
| 2013/0027750 | A1* | 1/2013 | Hinds et al. .................. 358/1.18 |
| 2013/0176327 | A1* | 7/2013 | Luttmer ....................... 345/590 |

OTHER PUBLICATIONS

Choi et al, "Fusion of Multispectral and Panchromatic Satellite Images Using then Curvelet Transform", IEEE Geoscience and Remote Sensing Letters, vol. 2, Issue 2, Apr. 2005, 136-140.
Cui, "Methods for Hyperspectral Image Visualization and Analysis", A Dissertation Presented in Partial Fulfillment of the Requirements for the Degree Doctor of Philosophy, Arizona Sate University, May 2010, 195 pages.

* cited by examiner

*Primary Examiner* — Michelle Entezari
(74) *Attorney, Agent, or Firm* — Dority & Manning, P.A.

(57) ABSTRACT

Hybrid images merge the benefits of map views and satellite images. A geographic information system includes a geographic information server and at least one database containing a plurality of map views and satellite images. A decomposition module of the geographic information server decomposes the map views and the satellite images into at least high frequency components and low frequency components. A map view and satellite image hybridization module blends the high frequency components from the map view and the high frequency components from the satellite image. Then, the hybridization module combines the low frequency components of the map view with the blended high frequency components from both the map view and the satellite image to form a hybrid image. The hybrid image can subsequently be stored in a database of the geographic information system and/or served to a client device via a network.

20 Claims, 5 Drawing Sheets

HYBRID IMAGES FOR MAPS COMBINING LOW FREQUENCY MAP DATA AND HIGH FREQUENCY SATELLITE IMAGE DATA

BACKGROUND

1. Field of the Invention

This invention relates to combining low frequency map data with high frequency satellite data in a hybrid map image.

2. Description of the Related Art

Users rely on traditional map views to obtain basic geographic information about an area of interest, such as which roads intersect, where points of interest are in relation to each other, and what geographic features are in the area. Certain mapping platforms, such as Google Maps (available at http://maps.google.com/), offer an alternative view of the same geographic area in the form of aerial photographs, referred to herein as satellite images. These satellite images provide additional detail about a geographic area, such as the location of trees, paths, buildings, and other natural and man-made features, which together are details that are typically not included in a traditional map view. However, because of the amount of detail in a satellite image, groupings of features of interest such as a park, a campus, a complex, and the like, may be more recognizable to a user from a traditional map than from a satellite image.

SUMMARY

In one aspect, the present invention merges the benefits of map views and satellite images into hybrid images for maps. A geographic information system includes a geographic information server and at least one database containing a plurality of map views and satellite images. A decomposition module of the geographic information server decomposes the map views and the satellite images into at least high frequency components and low frequency components. A map view and satellite image hybridization module blends the high frequency components from the map view and the high frequency components from the satellite image. Then, the hybridization module combines the low frequency components of the map view with the blended high frequency components from both the map view and the satellite image to form a hybrid image. The hybrid image can subsequently be stored in a database of the geographic information system and/or served to a client device via a network.

The features and advantages described in this summary and the following detailed description are not all-inclusive. Many additional features and advantages will be apparent to one of ordinary skill in the art in view of the drawings, specification, and claims hereof.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

Embodiments of the invention generate hybrid images from map views and satellite images. A map view is a vector image rendered from one or more geo databases. It labels main geo structures well, such as airports, railways, lakes, parks, and roads. For example, parks are traditionally represented as a green area and lakes are traditionally represented as blue areas on the map view. Due to the clear, obvious symbols used to mark these features in a map view, a user that wants to go to a park or visit a lake can easily identify these features on the map view. In contrast, satellite images are acquired by sensors and stored as pixel images in one or more geo databases. Their quality is limited by resolution, weather, cloud cover, and other conditions. A lake or a park in the satellite image is not as obvious as it is in the map view. However, the satellite image contains much richer information than the map view. For example, on the map view, a park is represented as a solid green mass, but in the satellite image, the trees, playground, trails, picnic tables, and the like may be visible. Embodiment of the invention combine the low frequency components of the data from the map view with a blend of the high frequency components of the data from the map view and the data from the satellite image to form a hybrid image that retains the advantages of both map views and satellite images.

Figure 1:
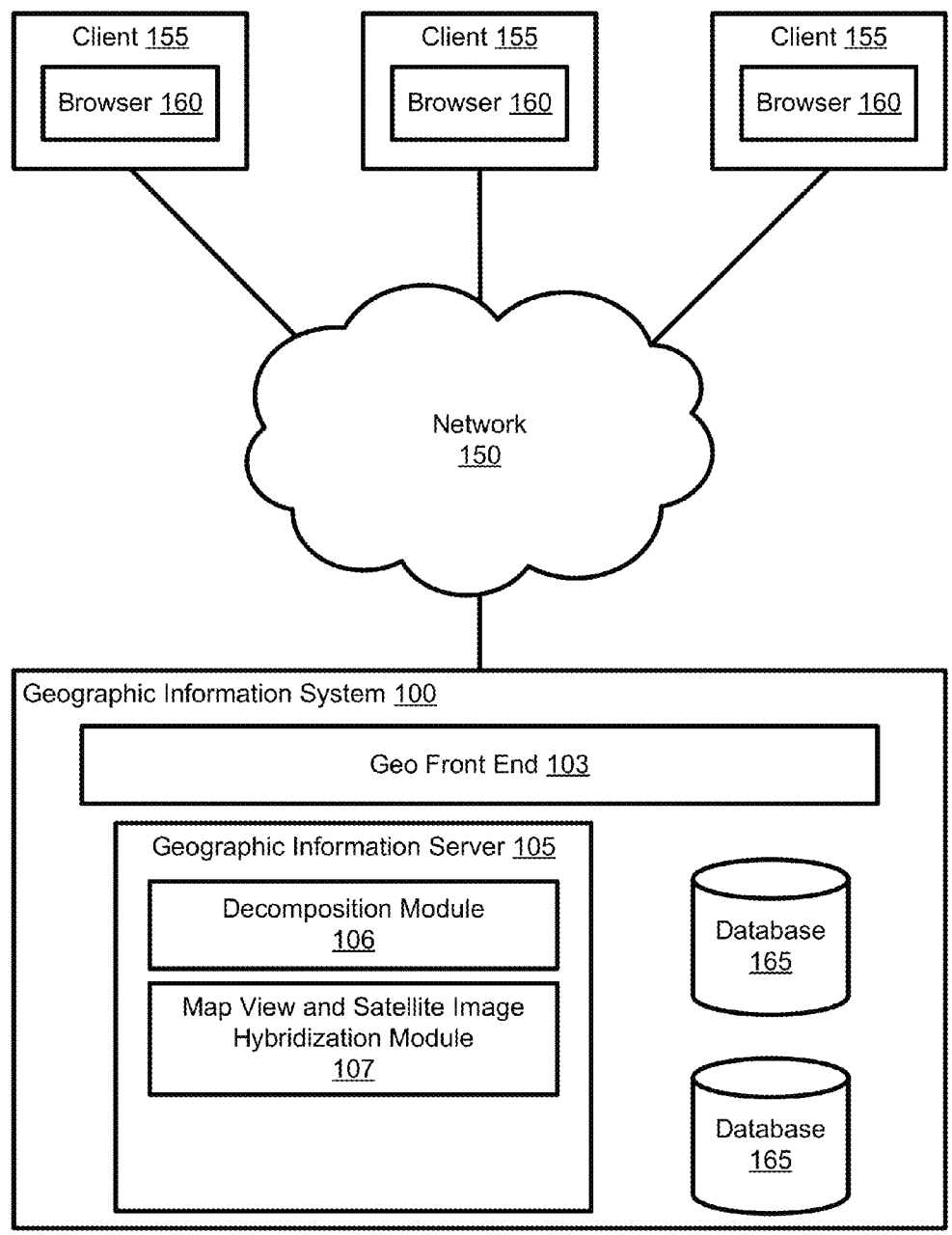
FIG. 1 is a high-level block diagram of a system environment in accordance with an embodiment of the invention.

FIG. 1 is a high-level block diagram of a system environment in accordance with an embodiment of the invention. The environment includes a geographic information system 100 and at least one client 155 connected via a network 150, such as the Internet. Although three clients 155 are shown in FIG. 1 for clarity, in practice, many hundreds, thousands or more clients may be connected to the geographic information system 100 via the network 150.

A client 155 can be any user device such as a computer, a mobile device, or the like that is adapted to communicate with the geographic information system 100 over the network 150. Each client 155 is equipped with a browser 160 to view maps retrieved from the geographic information system 100.

The geographic information system 100 includes at least one database 165, a geo front end 103, and at least one geographic information server 105. Although only two databases 165 are shown, in practice, there may be many databases or other data storage facilities that store data for the geographic information system 100. Likewise, a single geographic information server 105 is shown, but in practice, there may be many geographic information servers 105 in operation.

The databases 165 contain map data. Although the two databases 165 are shown as being internal to geographic information system, any type of data storage system, including local, remote, and distributed data storage systems can be used. Map data includes geographic data, such as latitude, longitude, elevation, location of geographic features of interest (e.g., bodies of water, mountains, forests); political data, such as country, state, and city boundaries; locations of roads and points of interest (e.g., government buildings, universities, stadiums), address numbering on streets; and attributes of features, such as whether an area is public and the nature of a surface of a street. The map data includes map features. A map feature is one entry in a map database corresponding to an item on a map. Examples of common map features include an intersection, a road, a landmark, a neighborhood, a park, a public transportation station, and a building. In some cases, some of the map data has been entered into the database 165 by users of the geographic information system 100. In one implementation, separate databases are maintained for data obtained through different sources. For example, one database may contain map data from a government source, and another database may contain data entered by users of the geographic information system 100. Still another database may contain satellite or other aerial images of geographic locations stored as pixel images. From the map data stored in the databases 165, the geographic information system 100 can generate vector image map views and access satellite images of a geographic area.

The geo front end 103 manages interactions between the clients 155 and the geographic information system 100. The geo front end 103 relays requests received from a client 155 to the geographic information server 105 and provides data retrieved from the databases 165 by the geographic information server 105 back to the client 155.

The geographic information server 105 generates hybrid map images from map views and satellite images stored in the databases 165 and serves the hybrid map images to clients 155. The geographic information server 105 includes a decomposition module 106 and a map view and satellite image hybridization module 107. The decomposition module 106 decomposes the map views and the satellite images into at least high frequency components and low frequency components. The map view and satellite image hybridization module 107 blends the high frequency components from the map view and satellite image and combines the blended high frequency components with the low frequency components of the map view to create a hybrid image. More detail regarding the operation of the hybridization module 107 is provided below with reference to FIG. 2. Once generated by the hybridization module 107, the hybrid image can then be served by the geographic information server 105 to a client 155 via the network 150.

Hybrid Images

Figure 2:
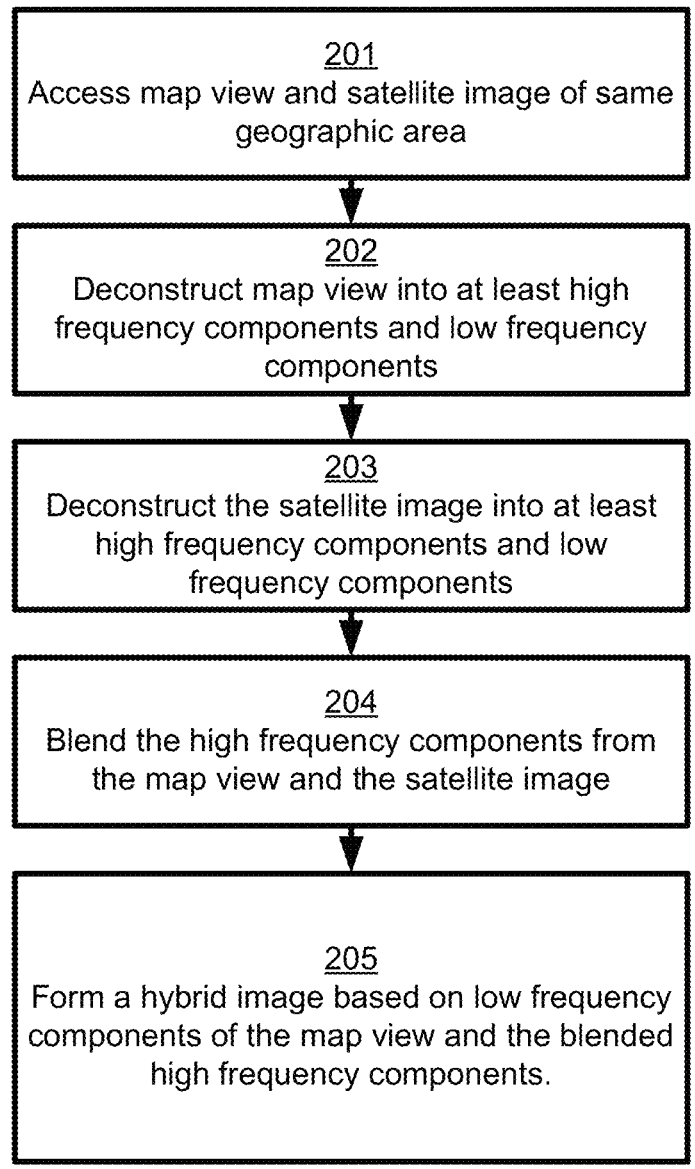
FIG. 2 is a flow chart illustrating a method of generating a hybrid image by combining aspects of a map view and a satellite image of an area, in accordance with an embodiment.

A hybrid image of a geographic area includes features from both the map view and the satellite image of the geographic area. Specifically, in the hybrid image, it is desirable to maintain the masses or relatively large blocks of single colors that mark regions on a map view, such as parks marked as a green filled polygon, bodies of water marked as blue filled polygons, parking lots marked as single-colored filled polygons, building complexes marked as single-colored filled polygons, and the like. The data that defines these features in the map view is generally the low frequency components of the map data. In the hybrid image, it is also desirable to include details that are available from the satellite image, such as the location of trees, playground equipment, trails, picnic tables, and other objects that are visible in the satellite image but not typically included in a map view. The data that defines these features in the satellite image is generally the high frequency components of the data. FIG. 2 illustrates an example method of generating a hybrid image from a map view and satellite image of the same geographic area, in accordance with an embodiment.

First, a map view and satellite image of the same geographic area are accessed 201. For example, the map view and satellite image may be obtained from one of the databases 165 of the geographic information system 100 by the geographic information server 105. The map view and the satellite image need not of precisely the same geographic area, but in cases where the overlapping region does not include the complete map view and/or complete satellite image, the hybrid image is generated only for the overlapping region.

The map view is deconstructed 202 into at least high frequency components and low frequency components of the data that makes up the map view. The deconstruction 202 may be accomplished by the decomposition module 106 of the geographic information server 105, for example by performing curvelet decomposition. In some cases, the map view is deconstructed into more than two frequency component bands, such as high, medium, and low. The techniques described here can be adapted for these situations without departing from the spirit and scope of this invention. The low frequency components of the map view contain the semantic information about the features of the map, such as the lakes, the parks, and the other features represented by large single-color polygons. It is these aspects of the map view that are desired to be maintained in the hybrid image.

The satellite image is also deconstructed 203 into at least high frequency components and low frequency components of the data that makes up the image. Similarly to the deconstruction 202 described above, this deconstruction 203 may be accomplished by the decomposition module 106 of the geographic information server 105, for example by performing curvelet decomposition. In some cases, the satellite view may be deconstructed into more than two frequency component bands, such as high, medium, and low, that may align with the frequency component bands used for the map view deconstruction 202. The high frequency components of the satellite image contain the details that are absent from the map view. It is these aspects of satellite image that are desired to be shown in the hybrid image.

After deconstruction 202,203 of the map view and the satellite image, the high frequency components from the map view are blended 204 with the high frequency components of the satellite image. In one embodiment, the ratio to combine the components is not globally constant across the image. In one implementation, the ratio to combine the components is region-specific. To add more details, the contributions of the high frequency components from the satellite image should be more heavily weighted than the contributions from the high frequency components from the map image for the pixels of the hybrid image that represent regions of parks, lakes, and the like. To reduce the number of details, the weight given to the contributions of the high frequency components from the map view is increased while the weight given to the contributions of the high frequency components from the satellite image is decreased. The ratio or other relative measure establishing the relative contribution from each of the map view and the satellite may be determined on a pixel by pixel basis.

In one embodiment, the problem of blending the high frequency components from the map view with the high frequency components of the satellite image can be addressed on a per pixel basis by finding the coefficients $C_m$ and $C_s$ in the following intensity equation:

$$I_h = I_m C_m + I_s C_s \qquad \text{Eq. (1)}$$

wherein $I_h$ represents the intensity of a pixel in the hybrid image; $I_m$ represents the intensity of the pixel in the map view; $I_s$ represents the intensity of the pixel in the satellite image; and $C_m$ and $C_s$ are coefficients that determine how much of final intensity of the pixel in the hybrid image $I_h$ is taken from the intensity of the pixel in the map view $I_m$ and the intensity of the pixel in the satellite image $I_s$, respectively. $C_m$ and $C_s$ are each $\geq 0$ and $\leq 1$ that further satisfy the equation:

$$C_s = 1 - C_m \qquad \text{Eq. (2)}$$

The relationship between the coefficients represented in Eq. (2) exists to prevent the hybrid image from being brightened or darkened noticeably as compared to the starting images.

Further, in one embodiment, the coefficient $C_m$ is determined according to the following equation:

$$C_m = [I_m/(I_m+I_s)]^\alpha \qquad \text{Eq. (3)}$$

wherein $\alpha$ is a variable ($\alpha \geq 0$) that can be modified to fine tune the contribution of the high frequency components from the map view and the contribution of the high frequency components from the satellite view through impacting the value of $C_m$, and therefore $C_s$.

In the case that the map view and the satellite image are deconstructed into components in three or more frequency bands, the pair of coefficients for one or more additional frequency bands can be determined similarly to the example described above with reference to Eq. (1)-(3). Instead of using the same $\alpha$ value across all frequency bands, the $\alpha$ value can be fine tuned separately for each band. Note that the base case of deconstructing into two bands of low and high frequencies described above can be viewed as a degrading case where $\alpha_{low}$ is set to 0, and $\alpha_{high}$ is the $\alpha$ of Eq. (3) above.

Lastly, a hybrid image is formed 205 based on the low frequency components of the map view and the blended high frequency components derived from the map view and satellite image. The low frequency components from the satellite image may be discarded ($\alpha_{low}$ is set to 0). In one implementation, once the ratio is defined for each pixel, the hybrid image can be reconstructed from the gradient/frequency domain using high dynamic range image processing techniques. Optionally, a human may iteratively tune the parameters and evaluate the results, for example by drawing a stroke on the hybrid image. Responsive to the stroke, a Gaussian diminishing ratio may be added to the pixels near or on the stroke. Ultimately, after a set of images have ratios defined per pixel, the set can be used as a corpus of training data for semi-automatic machine learning algorithms known to those of skill in the art, in order to predict per pixel ratios for other images.

Figure 3:
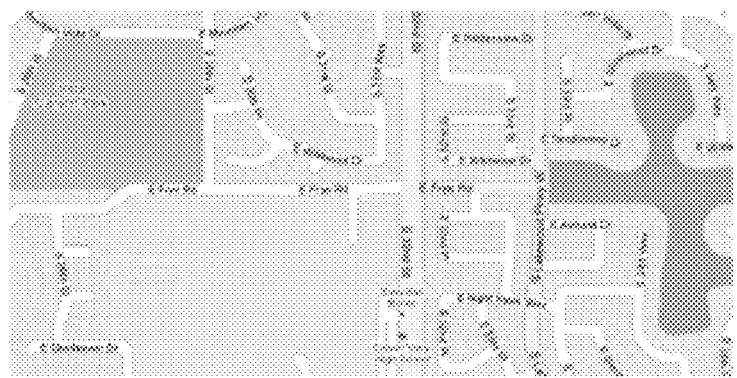
FIG. 3 illustrates an example map view of an area.
Figure 4:
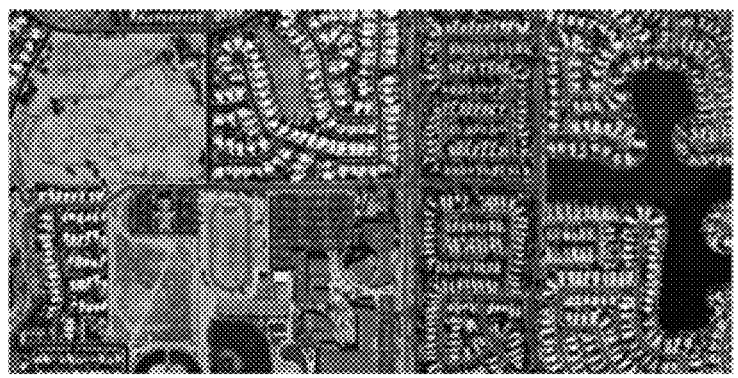
FIG. 4 illustrates a satellite image of the area shown in FIG. 3.
Figure 5:
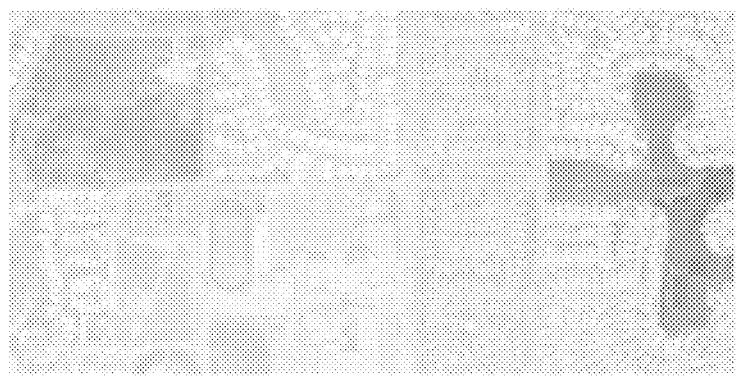
FIG. 5 illustrates an example hybrid image of the map view of FIG. 3 and the satellite image of FIG. 4.

FIG. 3 illustrates an example map view of an area. FIG. 4 illustrates a satellite image of the area shown in FIG. 3. FIG. 5 illustrates an example hybrid image of the map view of FIG. 3 and the satellite image of FIG. 4. The hybrid image in FIG. 5 maintains the large polygons of single colors that mark regions on a map view such as the park and the body of water while also showing details from the satellite image that are typically absent from map views. Thus, the advantages of both map views and satellite images are effectively combined in the hybrid image.

Additional Configuration Considerations

The present invention has been described in particular detail with respect to several possible embodiments. Those of skill in the art will appreciate that the invention may be practiced in other embodiments. Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method of generating hybrid images from a map view and a satellite image of a geographic area, the method comprising:

deriving high frequency components and low frequency components of the map view;
deriving high frequency components of the satellite image;
blending the high frequency components of the map view with the high frequency components of the satellite image; and
forming a hybrid image of the geographic area by combining the low frequency components of the map view with the blended high frequency components.

2. The method of claim 1, further comprising:
serving the hybrid image to a client device.

3. The method of claim 1, wherein the low frequency components of the map view comprise large filled polygons.

4. The method of claim 1, wherein deriving high frequency components and low frequency components of the map view comprises:
performing curvelet decomposition to deconstruct a vector image of the map view into at least two frequency bands including the high frequency components and the low frequency components.

5. The method of claim 1, wherein deriving high frequency components of the satellite image comprises:
performing curvelet decomposition to deconstruct a pixel image of the satellite image.

6. The method of claim 1, wherein blending the high frequency components of the map view with the high frequency components of the satellite image comprises combining the components based on a ratio that is region-specific.

7. The method of claim 1, wherein blending the high frequency components of the map view with the high frequency components of the satellite image comprises determining a ratio on a pixel by pixel basis.

8. The method of claim 1, wherein blending the high frequency components of the map view with the high frequency components of the satellite image comprises:
determining a first coefficient to apply to an intensity of a pixel in the map view and a second coefficient to apply to an intensity of a pixel in the satellite image to determine an intensity of a pixel in the hybrid image.

9. The method of claim 8, wherein the first and second coefficients sum to one.

10. A non-transitory computer-readable storage medium storing executable computer program code for generating hybrid images from a map view and a satellite image of a geographic area, the code comprising code for:
deriving high frequency components and low frequency components of the map view;
deriving high frequency components of the satellite image;
blending the high frequency components of the map view with the high frequency components of the satellite image; and
forming a hybrid image of the geographic area by combining the low frequency components of the map view with the blended high frequency components.

11. The non-transitory computer-readable storage medium of claim 10 further comprising code for:
serving the hybrid image to a client device.

12. The non-transitory computer-readable storage medium of claim 10, wherein the low frequency components of the map view comprise large filled polygons.

13. The non-transitory computer-readable storage medium of claim 10, wherein deriving high frequency components and low frequency components of the map view comprises:
performing curvelet decomposition to deconstruct a vector image of the map view into at least two frequency bands including the high frequency components and the low frequency components.

14. The non-transitory computer-readable storage medium of claim 10, wherein deriving high frequency components of the satellite image comprises:
performing curvelet decomposition to deconstruct a pixel image of the satellite image.

15. The non-transitory computer-readable storage medium of claim 10, wherein blending the high frequency components of the map view with the high frequency components of the satellite image comprises combining the components based on a ratio that is region-specific.

16. The non-transitory computer-readable storage medium of claim 10, wherein blending the high frequency components of the map view with the high frequency components of the satellite image comprises determining a ratio on a pixel by pixel basis.

17. The non-transitory computer-readable storage medium of claim 10, wherein blending the high frequency components of the map view with the high frequency components of the satellite image comprises:
determining a first coefficient to apply to an intensity of a pixel in the map view and a second coefficient to apply to an intensity of a pixel in the satellite image to determine an intensity of a pixel in the hybrid image.

18. The non-transitory computer-readable storage medium of claim 17, wherein the first and second coefficients sum to one.

19. A computing system comprising:
a computer processor for executing computer program code; and
a non-transitory computer-readable storage medium storing executable computer program code comprising code for:
deriving high frequency components and low frequency components of the map view;
deriving high frequency components of the satellite image;
blending the high frequency components of the map view with the high frequency components of the satellite image; and
forming a hybrid image of the geographic area by combining the low frequency components of the map view with the blended high frequency components.

20. The computing system of claim 19, further comprising code for:
serving the hybrid image to a client device.

* * * * *